United States Patent
Guyon et al.

(10) Patent No.: US 11,475,601 B2
(45) Date of Patent: Oct. 18, 2022

(54) IMAGE DECODING DURING BITSTREAM INTERRUPTIONS

(71) Applicant: Google LLC, Mountain View, CA (US)

(72) Inventors: Yannis Guyon, Paris (FR); Pascal Massimino, Orsay (FR)

(73) Assignee: GOOGLE LLC, Mountain View, CA (US)

(*) Notice: Subject to any disclaimer, the term of this patent is extended or adjusted under 35 U.S.C. 154(b) by 384 days.

(21) Appl. No.: 16/732,283

(22) Filed: Dec. 31, 2019

(65) Prior Publication Data

US 2021/0118186 A1   Apr. 22, 2021

Related U.S. Application Data

(60) Provisional application No. 62/924,128, filed on Oct. 21, 2019.

(51) Int. Cl.
| | | |
|---|---|---|
| *G06K 9/36* | (2006.01) | |
| *G06T 9/00* | (2006.01) | |
| *H04L 65/60* | (2022.01) | |
| *G06F 9/30* | (2018.01) | |
| *H04L 65/70* | (2022.01) | |
| *H04L 65/75* | (2022.01) | |
| *H04L 65/61* | (2022.01) | |

(52) U.S. Cl.
CPC ............ *G06T 9/00* (2013.01); *G06F 9/30145* (2013.01); *H04L 65/60* (2013.01); *H04L 65/61* (2022.05); *H04L 65/70* (2022.05); *H04L 65/764* (2022.05)

(58) Field of Classification Search
CPC ....... G06T 9/00; G06F 9/30145; H04L 65/60; H04L 65/70; H04L 65/764; H04L 65/61; H04N 19/89
See application file for complete search history.

(56) References Cited

U.S. PATENT DOCUMENTS 11,341,602 B2 * 5/2022 Bakalash .............. G06F 9/5083

FOREIGN PATENT DOCUMENTS

| BR | 122020000341 B1 | * | 8/2021 | ............. H04N 19/91 |
| CN | 1513268 A | * | 7/2004 | ........... H04N 19/109 |
| CN | 101360240 A | * | 2/2009 | ........... H04N 19/109 |
| CN | 105847792 B | * | 12/2018 | ........... H04N 19/105 |
| JP | WO2007010690 A1 | * | 1/2009 | ............. H04N 11/04 |
| JP | 2013098715 A | * | 5/2013 | ............... H04N 7/32 |
| SG | 10201607842 | * | 11/2016 | ............. H04N 19/91 |

* cited by examiner

*Primary Examiner* — Richard G Keehn
(74) *Attorney, Agent, or Firm* — Young Basile Hanlon & MacFarlane, P.C.

(57) ABSTRACT

A data stream accessor seeks to simulate an uninterrupted bitstream for a decoder during network interruptions. The accessor performs a set of operations including receiving an available amount of image data and storing a current execution context of the call site, passing execution flow to the decoder, and performing a subset of operations. The subset includes receiving an indication of a desired amount of image data from the decoder. If a total amount of image data at the accessor is greater than or equal to the desired amount, the desired amount is transmitted to the decoder for decoding. Otherwise, and unless an error issues, a current execution context of the decoder is stored, execution flow is passed from the decoder to the call site, and the restorable execution context is loaded as the current execution context of the call site. The subset is repeated unless the image is completely decoded.

20 Claims, 8 Drawing Sheets

IMAGE DECODING DURING BITSTREAM INTERRUPTIONS

CROSS-REFERENCE TO RELATED APPLICATION

This application claims priority to and the benefit of U.S. Provisional Patent Appln. No. 62/924,128, filed Oct. 21, 2019, the content of which is incorporated herein in its entirety by reference.

BACKGROUND

Compression, a lossy form of "encoding," can be used to represent visual information using a minimum number of bits. Images have statistical properties that can be exploited during compression, thereby making image compression techniques better than general purpose binary data compression techniques. Videos, being sequences of images, also have the same exploitable properties. The resulting data files are commonly sent over a network. For this reason, they may be interrupted, temporarily or indefinitely, at a decoder attempting to reconstruct the data.

SUMMARY

An aspect of the disclosed implementations is a method of decoding an image from a compressed bitstream. The method can include performing a set of operations at a receiving device that includes receiving, at a data stream accessor compatible with context switching, an available amount of image data of the image from a call site, the call site configured to call the decoder responsive to receiving at least a portion of the compressed bitstream from a network, storing a current execution context of the call site as a restorable execution context of the call site, passing execution flow to the decoder from the call site, and performing a subset of operations. The subset of operations can include receiving, at the data stream accessor, an indication of a desired amount of image data determined by the decoder, if a total amount of image data at the data stream accessor not previously sent to the decoder is greater than or equal to the desired amount of image data, transmitting the desired amount of image data to the decoder, and otherwise, and unless an error issues, storing a current execution context of the decoder as a restorable execution context of the decoder, passing the execution flow from the decoder to the call site, and loading the restorable execution context of the call site as the current execution context of the call site. The set of operations can include repeating the subset of operations unless the image is completely decoded or the error issues.

Another aspect of the disclosed implementations is an apparatus for decoding an image from a compressed bitstream. The apparatus can include a data stream accessor compatible with context switching that is implemented by one or more processors. The data stream accessor is configured to perform a set of operations including receiving an available amount of image data of the image from a call site, the call site configured to call the decoder responsive to receiving at least a portion of the compressed bitstream from a network, storing a current execution context of the call site as a restorable execution context of the call site, passing execution flow to the decoder from the call site, and performing a subset of operations. The subset of operations includes receiving, at the data stream accessor, an indication of a desired amount of image data determined by the decoder. If a total amount of image data at the data stream accessor not previously sent to the decoder is greater than or equal to the desired amount of image data, the desired amount of image data is transmitted to the decoder. Otherwise, and unless an error issues, the data stream accessor stores a current execution context of the decoder as a restorable execution context of the decoder, passes the execution flow from the decoder to the call site, and loads the restorable execution context of the call site as the current execution context of the call site. The subset of operations is repeated unless the image is completely decoded or the error issues.

Another apparatus described herein includes a decoder configured to decode a compressed bitstream, a call site implemented by one or more processors and configured to call the decoder responsive to receiving at least a portion of the compressed bitstream from a network, and a data stream accessor compatible with context switching that is implemented by one or more processors. The data stream accessor is configured to receive an available amount of image data of the image from the call site, store a current execution context of the call site as a restorable execution context of the call site, pass execution flow to the decoder from the call site, and load an execution context of the decoder. The decoder is configured to, until the decoder completely decodes the image or issues an error, provide an indication to the data stream accessor of a desired amount of image data determined by the decoder, while a total amount of image data at the data stream accessor is greater than or equal to the desired amount of image data, receive the desired amount of image from the data stream accessor, thereby reducing the total amount of image data remaining at the data stream accessor by the desired amount of image data, and decode the desired amount of image data. The data stream accessor is also configured to, responsive to the total amount of image data at the data stream accessor being less than the desired amount of image and unless the decoder completely decodes the image or issues the error, store a current execution context of the decoder as a restorable execution context of the decoder, pass the execution flow from the decoder to the call site, and load the restorable execution context of the call site as the current execution context of the call site to monitor for additional image data.

These and other aspects of the present disclosure are disclosed in the following detailed description of the embodiments, the appended claims, and the accompanying figures.

DETAILED DESCRIPTION

Lossy or lossless compression, or some combination of the two, can be used to code visual information of an image. The resulting compressed data are provided as a bitstream, generally for transmission over a network. Networks often exhibit delays or other interruptions in the transmission of data, and hence interruptions in the bitstream. A decompression algorithm (e.g., at a decoder) has difficulty handling partial data streams of encoded images.

Described herein are techniques for adapting the decoder to handle such interruptions in the bitstream. In brief, a data source structure encapsulating execution context manipulation is described herein that allows pausing and resumption of image decoding on bitstream interruptions. The techniques may allow display of as many pixels as early as possible in the decoding process, while seamlessly resuming the decoding process when new data for decoding is available at the call site for the decoder. Neither the call site nor the decoder may be aware of the structure, referred to herein as a data stream accessor, and the decoder may be unaware of the interruptions, particularly short interruptions, and the need to handle partial data streams is reduced.

Details of these techniques are described herein with initial reference to a system in which the teachings herein can be implemented.

Figure 1:
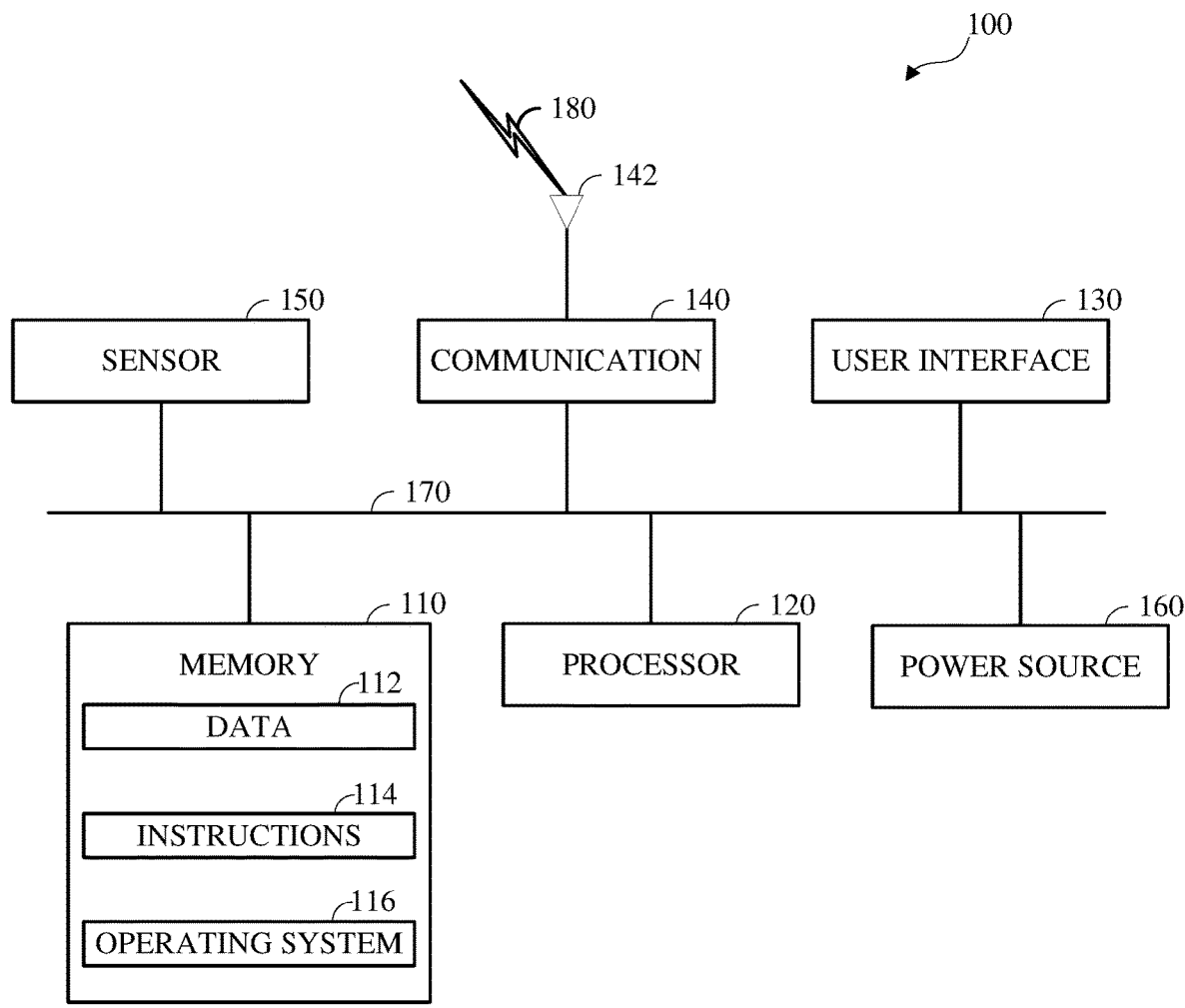
FIG. 1 is a diagram of a computing device in accordance with implementations of this disclosure.

FIG. 1 is a diagram of a computing device 100 in accordance with implementations of this disclosure. The computing device 100 shown includes a memory 110, a processor 120, a user interface (UI) 130, an electronic communication unit 140, a sensor 150, a power source 160, and a bus 170. As used herein, the term "computing device" includes any unit, or a combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one element or elements of the computing device 100 can be integrated into any number of separate physical units. For example, the user interface 130 and processor 120 can be integrated in a first physical unit and the memory 110 can be integrated in a second physical unit.

The memory 110 can include any non-transitory computer-usable or computer-readable medium, such as any tangible device that can, for example, contain, store, communicate, or transport data 112, instructions 114, an operating system 116, or any information associated therewith, for use by or in connection with other components of the computing device 100. The non-transitory computer-usable or computer-readable medium can be, for example, a solid state drive, a memory card, removable media, a read-only memory (ROM), a random-access memory (RAM), any type of disk including a hard disk, a floppy disk, an optical disk, a magnetic or optical card, an application-specific integrated circuits (ASICs), or any type of non-transitory media suitable for storing electronic information, or any combination thereof.

Although shown as a single unit, the memory 110 may include multiple physical units, such as one or more primary memory units, such as random-access memory units, one or more secondary data storage units, such as disks, or a combination thereof. For example, the data 112, or a portion thereof, the instructions 114, or a portion thereof, or both, may be stored in a secondary storage unit and may be loaded or otherwise transferred to a primary storage unit in conjunction with processing the respective data 112, executing the respective instructions 114, or both. In some implementations, the memory 110, or a portion thereof, may be removable memory.

The data 112 can include information, such as input audio and/visual data, encoded audio and/visual data, decoded audio and/or visual data, or the like. The visual data can include still images, frames of video sequences, and/or video sequences. The instructions 114 can include directions, such as code, for performing any method, or any portion or portions thereof, disclosed herein. The instructions 114 can be realized in hardware, software, or any combination thereof. For example, the instructions 114 may be implemented as information stored in the memory 110, such as a computer program, that may be executed by the processor 120 to perform any of the respective methods, algorithms, aspects, or combinations thereof, as described herein.

Although shown as included in the memory 110, in some implementations, the instructions 114, or a portion thereof, may be implemented as a special purpose processor, or circuitry, that can include specialized hardware for carrying out any of the methods, algorithms, aspects, or combinations thereof, as described herein. Portions of the instructions 114 can be distributed across multiple processors on the same machine or different machines or across a network such as a local area network, a wide area network, the Internet, or a combination thereof.

The processor 120 can include any device or system capable of manipulating or processing a digital signal or other electronic information now-existing or hereafter developed, including optical processors, quantum processors, molecular processors, or a combination thereof. For example, the processor 120 can include a special purpose processor, a central processing unit (CPU), a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors.

The user interface 130 can include any unit capable of interfacing with a user, such as a virtual or physical keypad, a touchpad, a display, a touch display, a speaker, a microphone, a video camera, a sensor, or any combination thereof. For example, the user interface 130 may be an audio-visual display device, and the computing device 100 may present audio, such as decoded audio, using the user interface 130 audio-visual display device, such as in conjunction with displaying video, such as decoded video. Although shown as a single unit, the user interface 130 may include one or more physical units. For example, the user interface 130 may include an audio interface for performing audio communication with a user, and a touch display for performing visual and touch-based communication with the user.

The electronic communication unit 140 can transmit, receive, or transmit and receive signals via a wired or wireless electronic communication medium 180, such as a radio frequency (RF) communication medium, an ultraviolet (UV) communication medium, a visible light communication medium, a fiber optic communication medium, a wireline communication medium, or a combination thereof. For example, as shown, the electronic communication unit 140 is operatively connected to an electronic communication interface 142, such as an antenna, configured to communicate via wireless signals.

Although the electronic communication interface 142 is shown as a wireless antenna in FIG. 1, the electronic communication interface 142 can be a wireless antenna, as shown, a wired communication port, such as an Ethernet port, an infrared port, a serial port, or any other wired or wireless unit capable of interfacing with a wired or wireless electronic communication medium 180. Although FIG. 1 shows a single electronic communication unit 140 and a single electronic communication interface 142, any number of electronic communication units and any number of electronic communication interfaces can be used.

The sensor 150 may include, for example, an audio-sensing device, a visible light-sensing device, a motion sensing device, or a combination thereof. For example, 100 the sensor 150 may include a sound-sensing device, such as a microphone, or any other sound-sensing device now existing or hereafter developed that can sense sounds in the proximity of the computing device 100, such as speech or other utterances, made by a user operating the computing device 100. In another example, the sensor 150 may include a camera, or any other image-sensing device now existing or hereafter developed that can sense an image such as the image of a user operating the computing device. Although a single sensor 150 is shown, the computing device 100 may include a number of sensors 150. For example, the computing device 100 may include a first camera oriented with a field of view directed toward a user of the computing device 100 and a second camera oriented with a field of view directed away from the user of the computing device 100.

The power source 160 can be any suitable device for powering the computing device 100. For example, the power source 160 can include a wired external power source interface; one or more dry cell batteries, such as nickel-cadmium (NiCd), nickel-zinc (NiZn), nickel metal hydride (NiMH), lithium-ion (Li-ion); solar cells; fuel cells; or any other device capable of powering the computing device 100. Although a single power source 160 is shown in FIG. 1, the computing device 100 may include multiple power sources 160, such as a battery and a wired external power source interface.

Although shown as separate units, the electronic communication unit 140, the electronic communication interface 142, the user interface 130, the power source 160, or portions thereof, may be configured as a combined unit. For example, the electronic communication unit 140, the electronic communication interface 142, the user interface 130, and the power source 160 may be implemented as a communications port capable of interfacing with an external display device, providing communications, power, or both.

One or more of the memory 110, the processor 120, the user interface 130, the electronic communication unit 140, the sensor 150, or the power source 160, may be operatively coupled via a bus 170. Although a single bus 170 is shown in FIG. 1, a computing device 100 may include multiple buses. For example, the memory 110, the processor 120, the user interface 130, the electronic communication unit 140, the sensor 150, and the bus 170 may receive power from the power source 160 via the bus 170. In another example, the memory 110, the processor 120, the user interface 130, the electronic communication unit 140, the sensor 150, the power source 160, or a combination thereof, may communicate data, such as by sending and receiving electronic signals, via the bus 170.

Although not shown separately in FIG. 1, one or more of the processor 120, the user interface 130, the electronic communication unit 140, the sensor 150, or the power source 160 may include internal memory, such as an internal buffer or register. For example, the processor 120 may include internal memory (not shown) and may read data 112 from the memory 110 into the internal memory (not shown) for processing.

Although shown as separate elements, the memory 110, the processor 120, the user interface 130, the electronic communication unit 140, the sensor 150, the power source 160, and the bus 170, or any combination thereof can be integrated in one or more electronic units, circuits, or chips.

Figure 2:
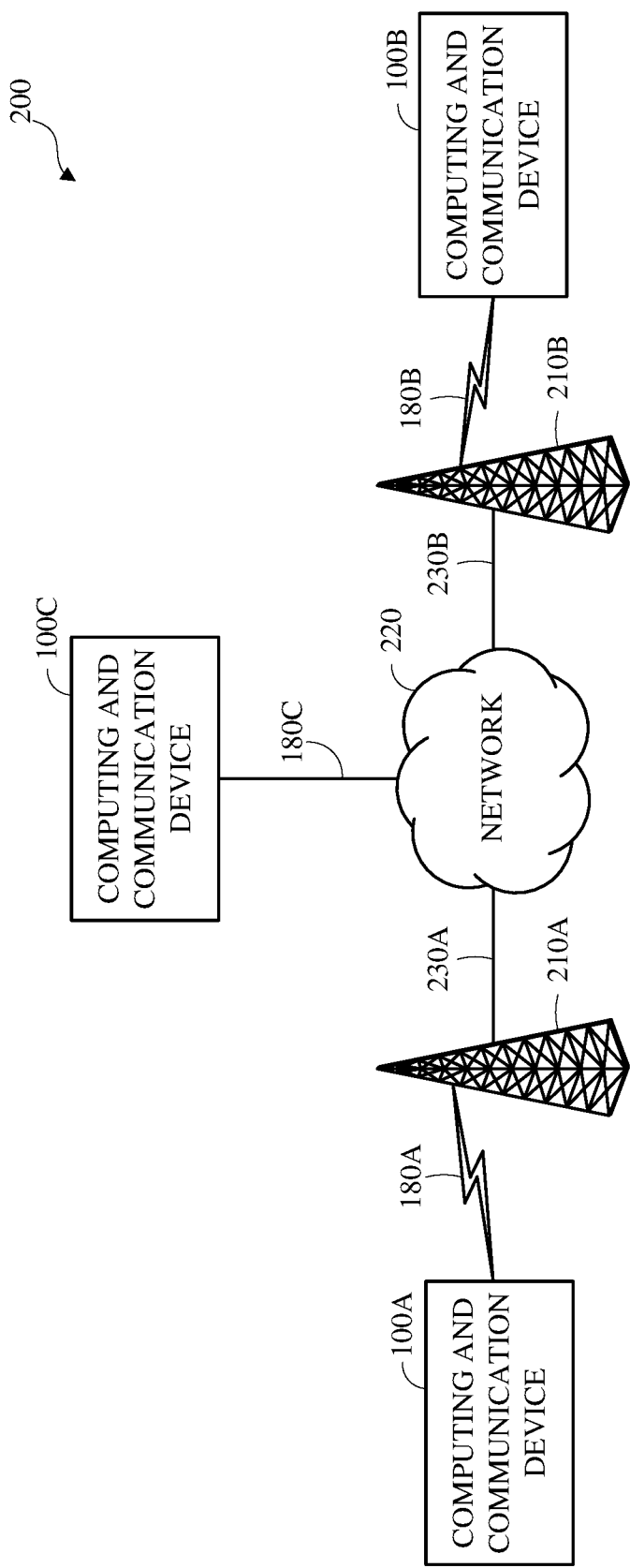
FIG. 2 is a diagram of a computing and communications system in accordance with implementations of this disclosure.

FIG. 2 is a diagram of a computing and communications system 200 in accordance with implementations of this disclosure. The computing and communications system 200 shown includes computing and communication devices 100A, 100B, 100C, access points 210A, 210B, and a network 220. For example, the computing and communication system 200 can be a multiple access system that provides communication, such as voice, audio, data, video, messaging, broadcast, or a combination thereof, to one or more wired or wireless communicating devices, such as the computing and communication devices 100A, 100B, 100C. Although, for simplicity, FIG. 2 shows three computing and communication devices 100A, 100B, 100C, two access points 210A, 210B, and one network 220, any number of computing and communication devices, access points, and networks can be used.

A computing and communication device 100A, 100B, 100C can be, for example, a computing device, such as the computing device 100 shown in FIG. 1. For example, the computing and communication devices 100A, 100B may be user devices, such as a mobile computing device, a laptop, a thin client, or a smartphone, and the computing and communication device 100C may be a server, such as a mainframe or a cluster. Although the computing and communication device 100A and the computing and communication device 100B are described as user devices, and the computing and communication device 100C is described as a server, any computing and communication device may perform some or all of the functions of a server, some or all of the functions of a user device, or some or all of the functions of a server and a user device. For example, the server computing and communication device 100C may receive, encode, process, store, transmit, or a combination thereof audio data and one or both of the computing and communication device 100A and the computing and communication device 100B may receive, decode, process, store, present, or a combination thereof the audio data.

Each computing and communication device 100A, 100B, 100C, which may include a user equipment (UE), a mobile station, a fixed or mobile subscriber unit, a cellular telephone, a personal computer, a tablet computer, a server, consumer electronics, or any similar device, can be configured to perform wired or wireless communication, such as via the network 220. For example, the computing and communication devices 100A, 100B, 100C can be configured to transmit or receive wired or wireless communication signals. Although each computing and communication device 100A, 100B, 100C is shown as a single unit, a computing and communication device can include any number of interconnected elements.

Each access point 210A, 210B can be any type of device configured to communicate with a computing and communication device 100A, 100B, 100C, a network 220, or both via wired or wireless communication links 180A, 180B, 180C. For example, an access point 210A, 210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A, 210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the HyperText Transport Protocol (HTTP), or a combination thereof.

The computing and communication devices 100A, 100B, 100C can communicate with each other via the network 220 using one or more a wired or wireless communication links, or via a combination of wired and wireless communication links. For example, as shown the computing and communication devices 100A, 100B can communicate via wireless communication links 180A, 180B, and computing and communication device 100C can communicate via a wired communication link 180C. Any of the computing and communication devices 100A, 100B, 100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A, 210B can communicate with the network 220 via one or more types of wired or wireless communication links 230A, 230B. Although FIG. 2 shows the computing and communication devices 100A, 100B, 100C in communication via the network 220, the computing and communication devices 100A, 100B, 100C can communicate with each other via any number of communication links, such as a direct wired or wireless communication link.

In some implementations, communications between one or more of the computing and communication device 100A, 100B, 100C may omit communicating via the network 220 and may include transferring data via another medium (not shown), such as a data storage device. For example, the server computing and communication device 100C may store audio data, such as encoded audio data, in a data storage device, such as a portable data storage unit, and one or both of the computing and communication device 100A or the computing and communication device 100B may access, read, or retrieve the stored audio data from the data storage unit, such as by physically disconnecting the data storage device from the server computing and communication device 100C and physically connecting the data storage device to the computing and communication device 100A or the computing and communication device 100B.

Other implementations of the computing and communications system 200 are possible. For example, in an implementation, the network 220 can be an ad-hoc network and can omit one or more of the access points 210A, 210B. The computing and communications system 200 may include devices, units, or elements not shown in FIG. 2. For example, the computing and communications system 200 may include many more communicating devices, networks, and access points.

Figure 3:
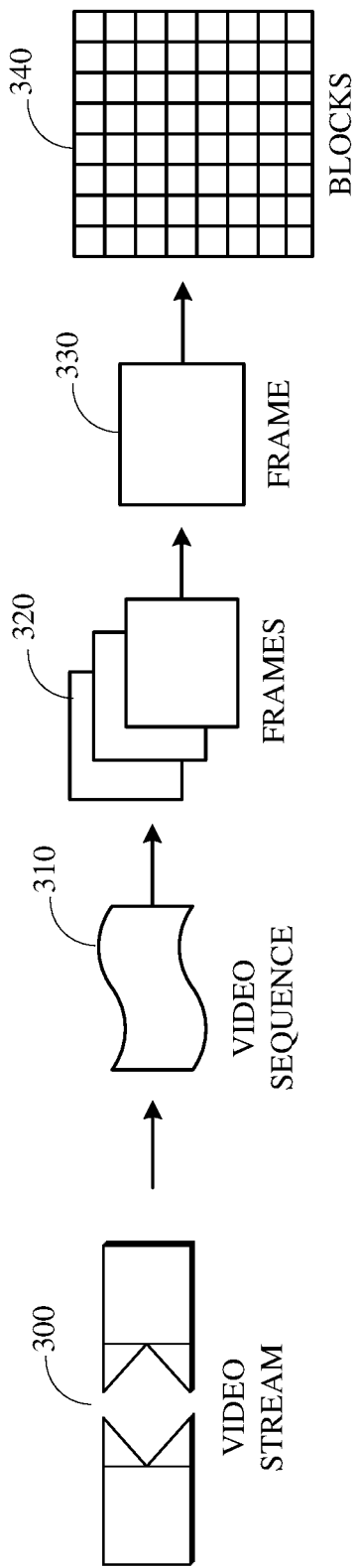
FIG. 3 is a diagram of a video stream used to explain encoding and decoding in accordance with implementations of this disclosure.

FIG. 3 is a diagram of a video stream 300 used to explain encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320.

Each frame 330 from the adjacent frames 320 may represent a single image from the video stream. Although not shown in FIG. 3, a frame 330 may include one or more segments, tiles, or planes, which may be coded, or otherwise processed, independently, such as in parallel. A frame 330 may include blocks 340. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a superblock, a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Encoding and decoding are explained with reference to the video stream 300, which is a sequence of images. However, this is only an example. The teachings herein are applicable to encoding and decoding individual images (sometimes referred to as still images herein). However, there may be differences when applied to still images. When applied to still images, for example, prediction described below is typically limited to intra prediction.

Figure 4:
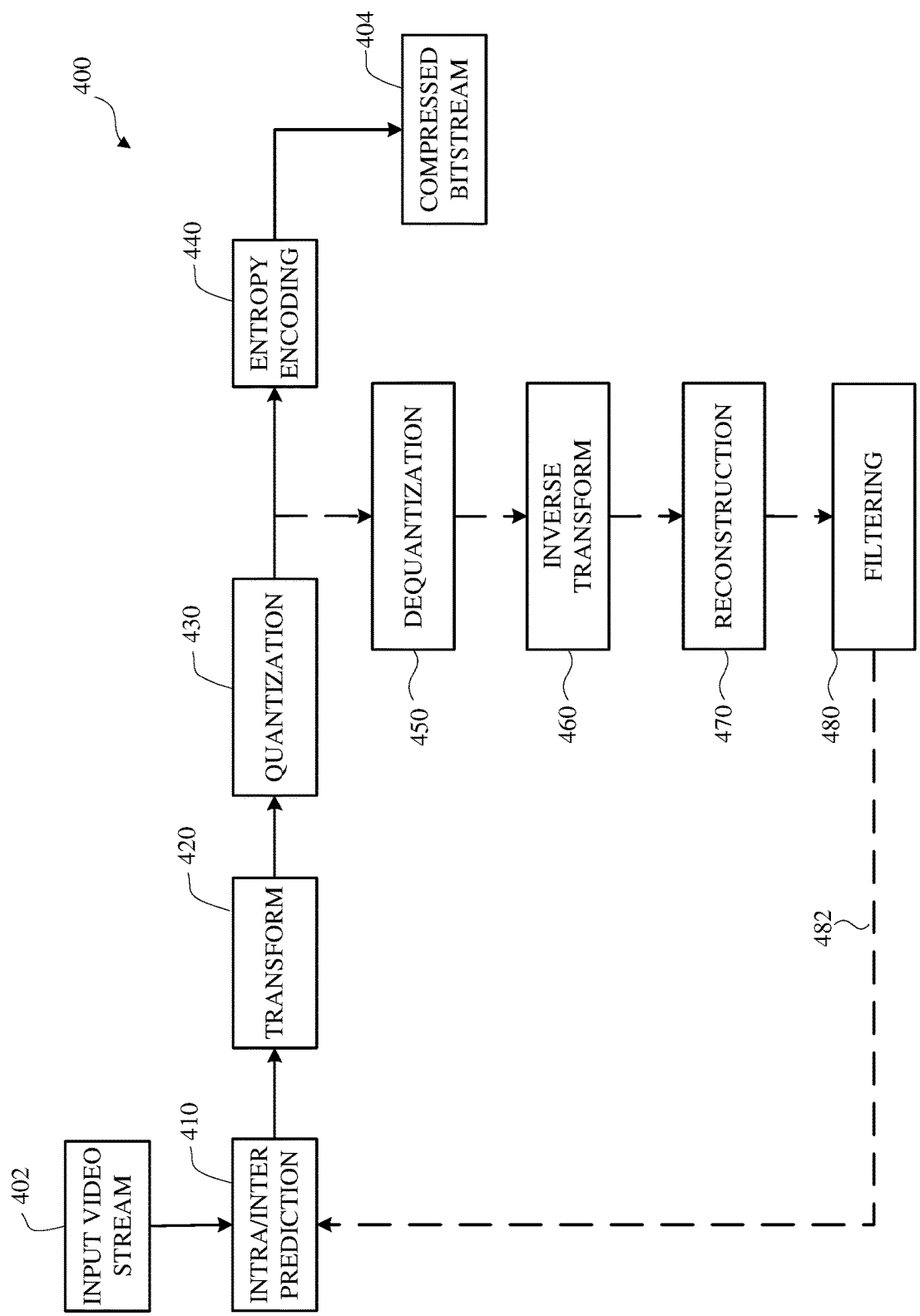
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to encode video data as described herein. The encoder 400 can be implemented as specialized hardware included, for example, in computing device 100.

The encoder 400 can encode an input video stream 402, such as the video stream 300 shown in FIG. 3, to generate an encoded (compressed) bitstream 404. In some implementations, the encoder 400 may include a forward path for generating the compressed bitstream 404. The input video stream 402 can be a single image or a collection of images.

The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference portion of the reference frame. In the case of encoding a single image (e.g., an image that is not part of a video sequence and/or a sequence of images), the intra/inter prediction unit 410 can encode the image using intra-frame prediction.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), the Singular Value Decomposition Transform (SVD), and the Asymmetric Discrete Sine Transform (ADST). In an example, the DCT may include transforming a block into the frequency domain. The DCT may include using transform coefficient values based on spatial frequency, with the lowest frequency (i.e. DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
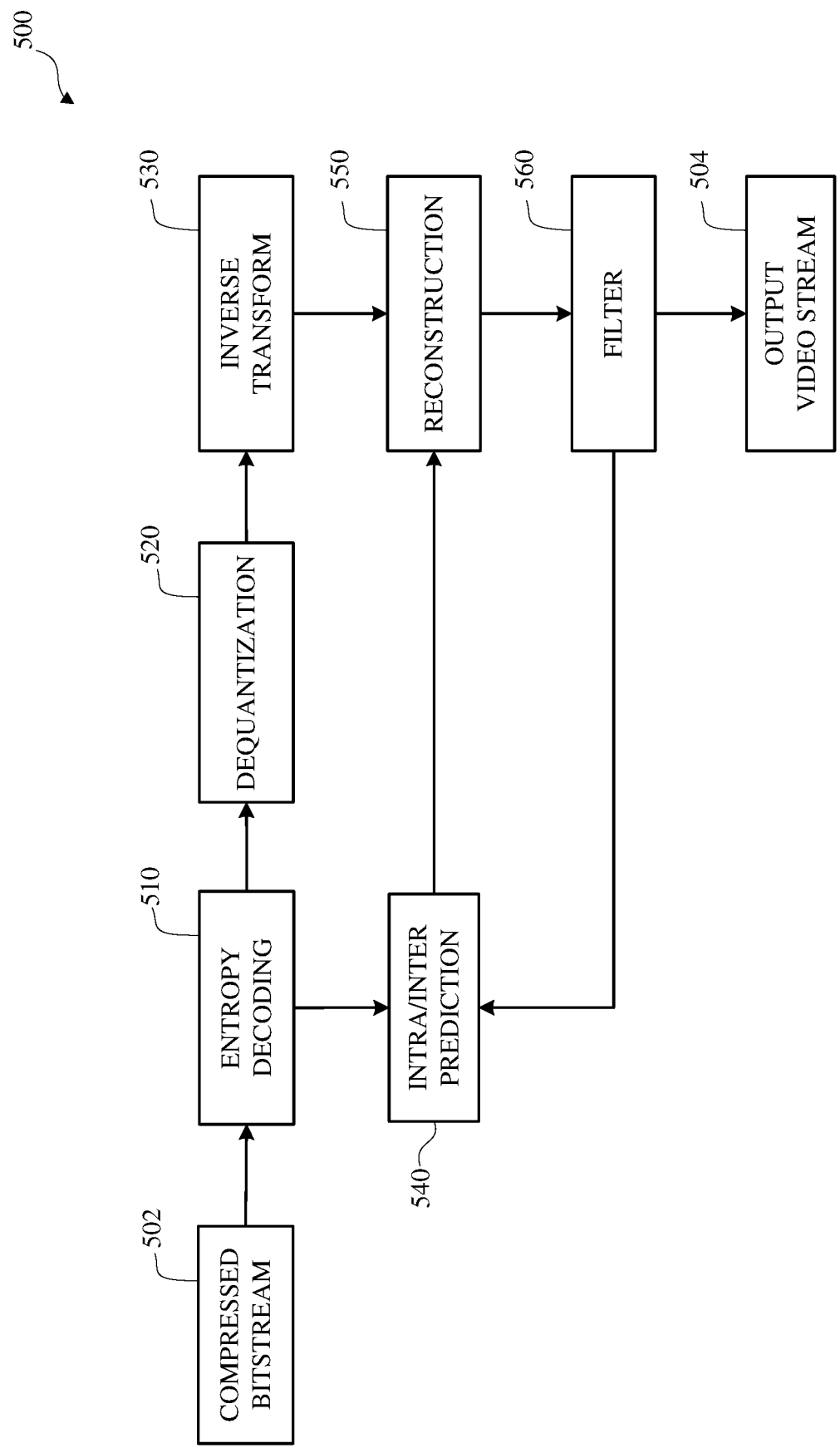
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below and may include decoding the encoded frame, or a portion thereof, which may include decoding an encoded block, which may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a decoded block. The filtering unit 480 can be applied to the decoded block to generate a reconstructed block, which may reduce distortion, such as blocking artifacts. Although one filtering unit 480 is shown in FIG. 4, filtering the decoded block may include loop filtering, deblocking filtering, or other types of filtering or combinations of types of filtering. The reconstructed block may be stored or otherwise made accessible as a reconstructed block, which may be a portion of a reference frame, for encoding another portion of the current frame, another frame, or both, as indicated by the broken line at 482.

Other variations of the encoder 400 can be used to encode the compressed bitstream 404. For example, a non-transform based encoder can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to decode video data as described herein. The decoder 500 can be implemented as specialized hardware included, for example, in computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a filtering unit 560, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond to the derivative residual block generated by the inverse transform unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a decoded block. The filtering unit 560 can be applied to the decoded block to reduce artifacts, such as blocking artifacts, which may include loop filtering, deblocking filtering, or other types of filtering or combinations of types of filtering, and which may include generating a reconstructed block, which may be output as the output video stream 504.

Other variations of the decoder 500 can be used to decode the compressed bitstream 502. For example, the decoder 500 can produce the output video stream 504 without deblocking at the filtering unit 560.

As explained initially, compressing images or individual video frames leads to data files that are commonly sent over a network. These streams might get interrupted, temporarily or indefinitely. It is desirable to adapt the decoder (also referred to herein as a decompression algorithm or a codec) to handle partial data streams of encoded images, optionally display as many pixels as early as possible, and safely resume when new data (e.g., bytes are available).

According to the teachings herein, a small functional (e.g., software) unit may be used that returns some data (or an error) when asked for a certain amount of data. The unit is referred to herein as a data stream accessor that may be a getter or a getter function, and may have a simple interface. The data stream accessor is desirably compatible with context switching. Context switching allows storing of the state of a process or thread (e.g., the call stack), so that it can be restored and execution resumed from the same point later. The context switching may be embedded or encapsulated within the getter function without exposing the context switching. The particular context switching used is not limited and may depend on the operating system and/or the software used. For example, context switching available with UNIX® user context manipulation or Windows® fibers may be used. As a result of this combination, a call site gets back the execution flow whenever the decoder tries to read data that is not yet available. This combination of a data source structure encapsulating execution context manipulation allows image or video decoding to pause and resume on bitstream interruptions as described in additional detail below. Because video coding involves encoding a series of images, the decoding herein refers to an image, but the process is unchanged when a series of images (e.g., a video sequence or stream) is to be decoded.

Figure 6A:
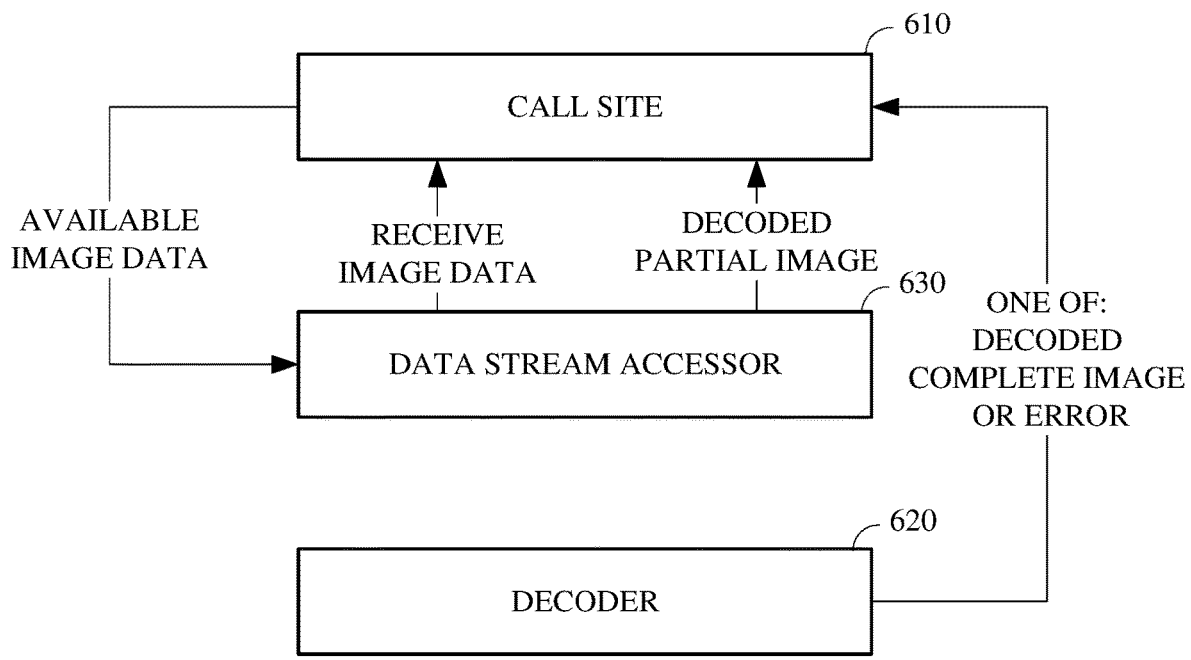
FIG. 6A is a block diagram of point of view of a call site during decoding according to implementations of this disclosure.
Figure 6B:
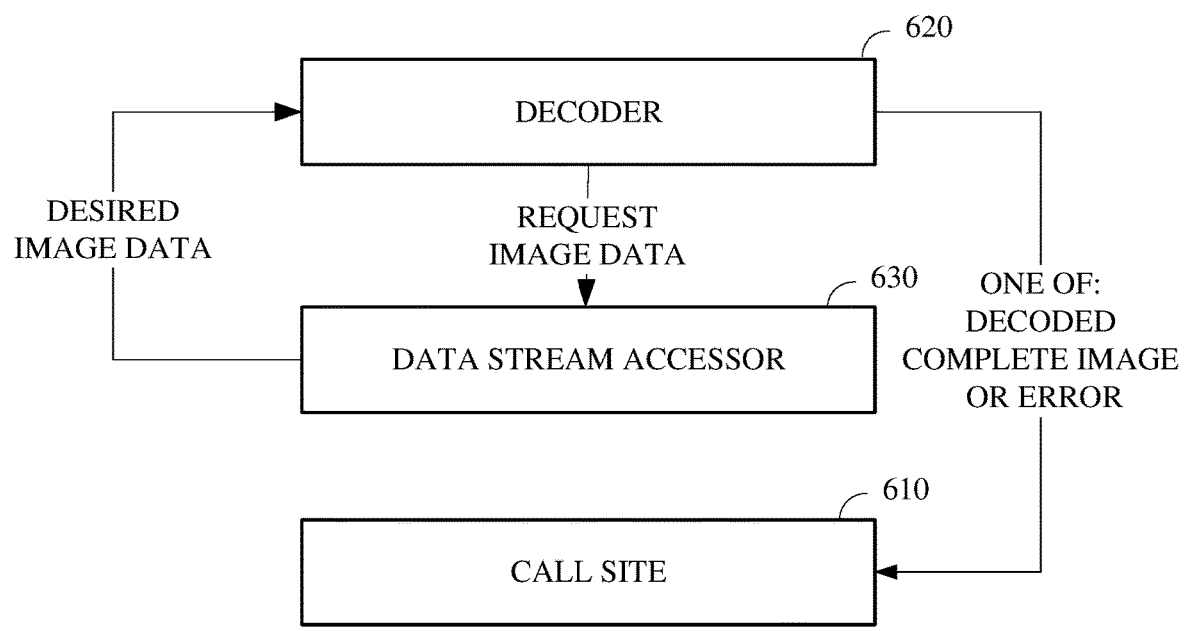
FIG. 6B is a block diagram of point of view of a decoder during decoding according to implementations of this disclosure.
Figure 6C:
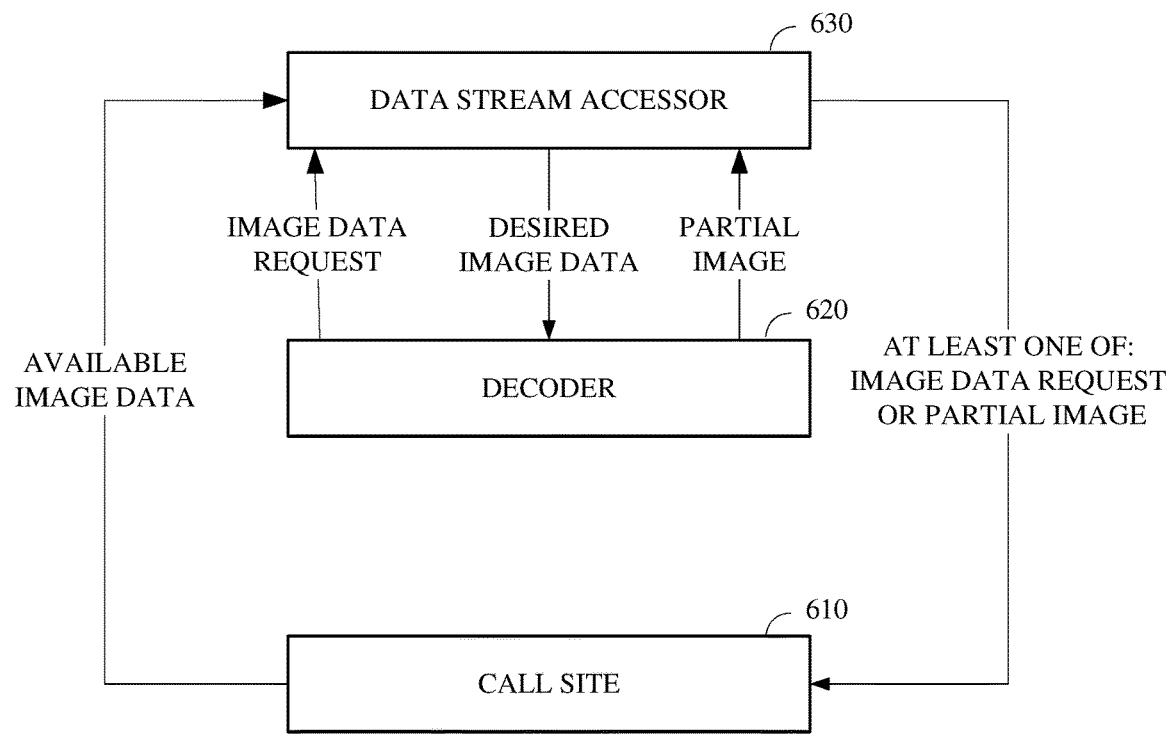
FIG. 6C is a block diagram of point of view of a data stream accessor during decoding according to implementations of this disclosure.

Referring now to FIGS. 6A-6C, certain interactions between the call site 610, the data stream accessor 630, and the decoder 620 are shown. Each of the call site 610, the data stream accessor 630, and the decoder 620 may be implemented at a receiving device, such as a computing and communication device 100A, 100B, 100C.

FIG. 6A is a block diagram of the point of view of the call site 610 during a process of decoding an image from a compressed bitstream according to the teachings herein. The call site 610 may be implemented by one or more processors, such as a processor 120, at the receiving device. The call site 610 may be implemented, for example, by the processor through the execution of instructions stored in a memory, such as a memory 110. The call site 610 is configured to call the decoder 620 responsive to receiving at least a portion of the compressed bitstream at the network, such as the network 220. The call site 610 can receive an available amount of image data from the network. The call site 610 can then transmit the available amount of image data to the data stream accessor 630, as shown by the arrow extending from the call site 610 to the data stream accessor 630.

The available amount of image data may correspond to any amount of compressed image data of the image. The available amount of image data may correspond to a slice, a block, or a portion of a slice or block. The available amount of image data may be measured in bytes or some other unit. When the receiving device initially receives a request for decoding the image from the network (e.g., with the compressed bitstream), the available amount of image data of the image transmitted from the call site 610 in response may be a minimal amount of image data. The minimal amount of image data is an amount sufficient to initialize the decoder 620, such as by allowing the main context of the decoder 620 to create a local context for the decoding process.

As can be seen from the arrow extending from the decoder 620 to the call site 610, the call site 610 may receive, responsive to transmitting the available amount of image data, a completely decoded image. Further, and as can be seen from one of the arrows extending from the data stream accessor 630 to the call site 610, the call site 610 may receive, as a result of the context switching described below, a partially decoded image. In some implementations, the call site 610 receives, instead of the partially or completely decoded image, a notification of the partially or completely decoded image. It is also possible that the call site 610 only receives the completely decoded image or a notification of the completely decoded image. The call site 610 may additionally or instead receive, responsive to transmitting the available amount of image data, an error signal from the decoder 620 as discussed in further detail below with regards to the decoder 620, and as also seen by the arrow extending from the decoder 620 to the call site 610.

Whether or not the call site 610 is expressly signaled that decoding is not complete (either through receipt of a notification or a partially decoded image), the call site 610 receives, responsive to transmitting the available amount of image data, a return from the data stream accessor 630 seeking more image data when decoding is not complete. This is shown in FIG. 6A by one of the arrows extending from the data stream accessor 630 to the call site 610. This processing is discussed in further detail below with regards to the data stream accessor 630.

Although not expressly shown in FIG. 6A, the available amount of image data that is transmitted to the data stream accessor 630 may be different from the available amount of image data previously transmitted by the call site 610. For example, the call site 610 may provide whatever amount of image data is available each time the data stream accessor 630 returns for additional data as described below with regards to the data stream accessor 630. In some implementations, no additional image data is available at the call site 610. This can happen, for example, during an extended network interruption. In this example, the call site 610 may transmit an indicator to the data stream accessor 630 that no additional image data is available. The indicator may be any type of indicator, including the return of an available amount of image data of zero to the data stream accessor 630.

It is possible to operate the call site 610 so that the call site 610 waits until a defined amount of time lapses before returning any available image data (or no image data if none is available). This may be useful for relatively brief network interruptions.

FIG. 6B is a block diagram of point of view of a decoder 620 during a process of decoding an image from a compressed bitstream according to the teachings herein. The decoder 620 may be implemented by one or more processors, such as a processor 120, at the receiving device. The decoder 620 may be implemented, for example, by the processor through the execution of instructions stored in a memory, such as a memory 110. The decoder 620 may be implemented in whole or in part using hardware. The decoder 620 may be implemented by the same processor as or a different processor from the call site 610. The decoder 620 may be any image decoder or video decoder, such as the decoder 500 of FIG. 5.

The decoder 620, once called, determines a desired amount of image data needed to continue decoding. The decoder 620 may request or provide some other indication of the desired amount of image data. In the example of FIG. 6B, the decoder 620 provides the indication of the desired amount of image data to the data stream accessor 630, as can be seen from the arrow extending from the decoder 620 to the data stream accessor 630. The indication or request does not need to be in any particular format, so long as the data stream accessor can compare the desired amount of image data to the total amount of image data not previously sent to the decoder. The desired amount of image data may correspond to any amount of image data of the image. The image data may correspond to a slice, a block, or some other coding unit of the image. The desired amount of image data may be measured in bytes or some other unit. As indicated by the arrow extending from the data stream accessor 630 to the decoder 620, the decoder 620 receives the desired amount of image data so long as the data stream accessor 630 has at least the desired amount of image data as discussed in further detail below with regards to the data stream accessor 630.

The decoder 620, upon receipt of the desired amount of image data, decodes the received image data. The decoding may be performed according to the decoding described with regards to the decoder 500, for example. Thereafter, and responsive to decoding the desired amount of image data, the decoder 620 can transmit another request for or indication of the desired amount of image data unless the image is decoded. The decoder 620 may return a completely decoded image, or an indicator as described above, to the call site 610.

When the image is not completely decoded, the desired amount of image data may vary. For example, the decoder 620 may transmit multiple requests for image data to the data stream accessor 630. When more than one request is made, the decoder 620 may determine that a different amount of image data is needed to continue decoding from one request to the next. For example, the desired amount of image data included in one (e.g., a first) request may be different from the desired amount of image data included in another (e.g., a second) request. In some implementations, the desired amount of image data is the same for each request.

It is possible that, upon a request for the desired amount of image data from the decoder 620, the data stream accessor 630 does not have enough or indeed any amount of image data remaining. In this situation, the decoder 620 may receive an indicator transmitted from the data stream accessor 630 that the desired amount of image data is not available. For example, the indicator may be the receipt of an available amount of image data that is less than the desired amount of image data that was included with the request from the decoder 620. The indicator may be a binary code for no or an error. Other indicators are possible.

The indicator results in issuance of an error from the decoder 620 to the call site 610. Issuance of an error can stop the decoding. Additionally or alternatively, issuance of an error will trigger error concealment or correction, or other error recovery measures (e.g., in video coding). In some cases, error recovery measure may continue operating the decoder 620.

FIG. 6C is a block diagram of point of view of a data stream accessor 630 during a process of decoding an image from a compressed bitstream according to the teachings herein. As mentioned briefly above, the data stream accessor 630 may comprise software, that is, instructions stored in a memory, such as a memory 110, that are executed by one or more processors, such as the processor 120, to perform the processes and methods described herein. The data stream accessor 630 may be implemented, at least in part, by hardware. The data stream accessor 630 is, in some implementations, encapsulated within the decoder 620 such that it is hidden from the call site 610. Alternatively, the data stream accessor 630 may be a separate module or arrangement of instructions that is instantiated by the call site 610, such that an instance of the data stream accessor 630 is given from the call site 610 to the decoder 620.

However implemented, the data stream accessor 630 is compatible with context switching. For example, the data stream accessor 630 can call, implement, or otherwise execute context switching. The context switching may be native to the operating system of the receiving station that implements the decoder 620. In some implementations, the decoder 620 may incorporate the data stream accessor 630 at its middle processing (main context) layer, that is, between the user space (represented by the calling site 610) and the codec space performing decoding using a local context created by the middle processing layer.

As generally shown in FIG. 6C, the data stream accessor 630 can be used to pause and resume decoding of an image on the occurrence of bitstream interruptions by its interactions with the call site 610 and the decoder 620. Stated most simply, the data stream accessor 630 passes execution flow between the call site 610 and the decoder 620 during (e.g., network) conditions that result in bitstream interruptions so that the bitstream interruptions are mostly invisible to the decoder 620. When the decoder 620 completely decodes the image or issues an error because the data stream accessor 630 indicates that no further image data is available when decoding is not complete, processing by the data stream accessor 630 is no longer required. The decoder 620 may directly communicate either of these conditions to the call site 610 directly.

In more detail, the data stream accessor 630 can perform a set of operations that includes receiving the available amount of image data of the image from the call site 610 as shown by the arrow extending from the call site 610 to the data stream accessor 630, storing a current execution context of the call site 610 as a restorable execution context of the call site 610, passing execution flow to the decoder 620 from the call site 610, and performing a subset of operations relative to the decoder 620.

In the subset of operations, the data stream accessor 630 receives in indication of, such as a request for, a desired amount of image data determined by the decoder 620 as described above with regards to FIG. 6B and as shown by the arrow requesting image data extending from the decoder 620 to the data stream accessor 630 in FIG. 6C. Then, if a total amount of image data at the data stream accessor 630 not previously sent or transmitted to the decoder 620 is greater than or equal to the desired amount of image data, the desired amount of image data is transmitted to the decoder 620, as shown by the arrow extending between the data stream accessor 630 and the decoder 620. In some implementations, the transmittal may be a transfer of the desired amount of image data to the decoder 620 that reduces the total amount of image data remaining at the data stream accessor 630 by the desired amount of image data. In other cases, the transmittal may be providing a copy of the desired amount of image data to the decoder 620 such that the data stream accessor 630 maintains the image data it receives.

If instead the total amount of image data at the data stream accessor 630 not previously sent to the decoder 620 is less than the desired amount of image data that is needed for the decoder 620 to continue decoding, and unless an error has issued from the decoder 620, the current execution context of the decoder 620 is stored as a restorable execution context of the decoder 620, the execution flow is passed from the decoder 620 to the call site 610, and the restorable execution context of the call site 610 is loaded as the execution context of the call site 610 so that the call site 610 can continue to monitor for image data.

The subset may be repeated unless the image is completely decoded or the error has issued. That is, the subset of operations may be repeated multiple times. For example, each time the subset of operations is successfully performed to transmit the desired amount of image data to the decoder 620, the available amount of image data that was provided to the data stream accessor 630 from the call site 610 may be further reduced until all of the image data is consumed by the decoder 620 and decoding is complete or the decoder 620 requests another desired amount of image data and the total amount of image data remaining at the data stream accessor 630 is insufficient to meet the request.

If the execution flow is passed from the decoder 620 to the call site 610, this means that the image has not been completely decoded, and an error has not issued. The current execution context of the decoder 620 has been stored as a restorable execution context of the decoder 620. The partially decoded image may be extracted, copied or otherwise received therefrom at the data stream accessor 630 as can be seen from the labeled arrow extending between the decoder 620 and the data stream accessor 630.

Then, the set of operations may be repeated. That is, the data stream accessor 630 can receive an available amount of image data from the call site, if any. The execution flow is passed again to the decoder 620 in conjunction with loading the restorable execution context of the decoder 620 as the current execution context of the decoder 620. Unless an error issues because the data stream accessor 630 indicates to the decoder 620 that the desired amount of image data is unavailable, the subset of operations is repeated.

In general, then, when the data stream accessor 630 is called, e.g., by the decoder 620, there are two possible situations relative to the available amount of image data. If there is enough data immediately available at the data stream accessor 630, the decoder 620 continues with the decompression. If there is not enough data at the time, the execution context is passed from the data stream accessor 630 to the call site 610 based on context switching.

After the execution context is passed, either of two actions may take place. More of the bitstream arrives from the call site 610 (e.g., an available amount of image data), and the call site 610 gives back the execution context to the data stream accessor 630, which may in turn return bytes that are decompressed by the decoder 620 (e.g., in the form of a partial image). Alternatively, the bitstream is stopped, and the data stream accessor 630 returns an error for the decoder 620 to resolve (e.g., clean up, handle, address). The bitstream can stop if a defined condition is met or is not met. For example, this can occur if a defined (e.g., predetermined) amount of time passes after the execution context is passed from the data stream accessor 630 to the call site 610, and enough data is not received from the network to meet the current decoding needs of the decoder 620. The decoder 620 resolves the error (e.g., not receiving all of the data for reconstruction of an image) according to its techniques for error handling.

FIGS. 6A-6C describe the point of view from each of the call site 610, the decoder 620, and the data stream accessor 630 of the signaling among the components. They do not expressly show the sequence of operations, which can vary from image to image, and can vary based on the number and duration of any network interruptions.

Figure 7:
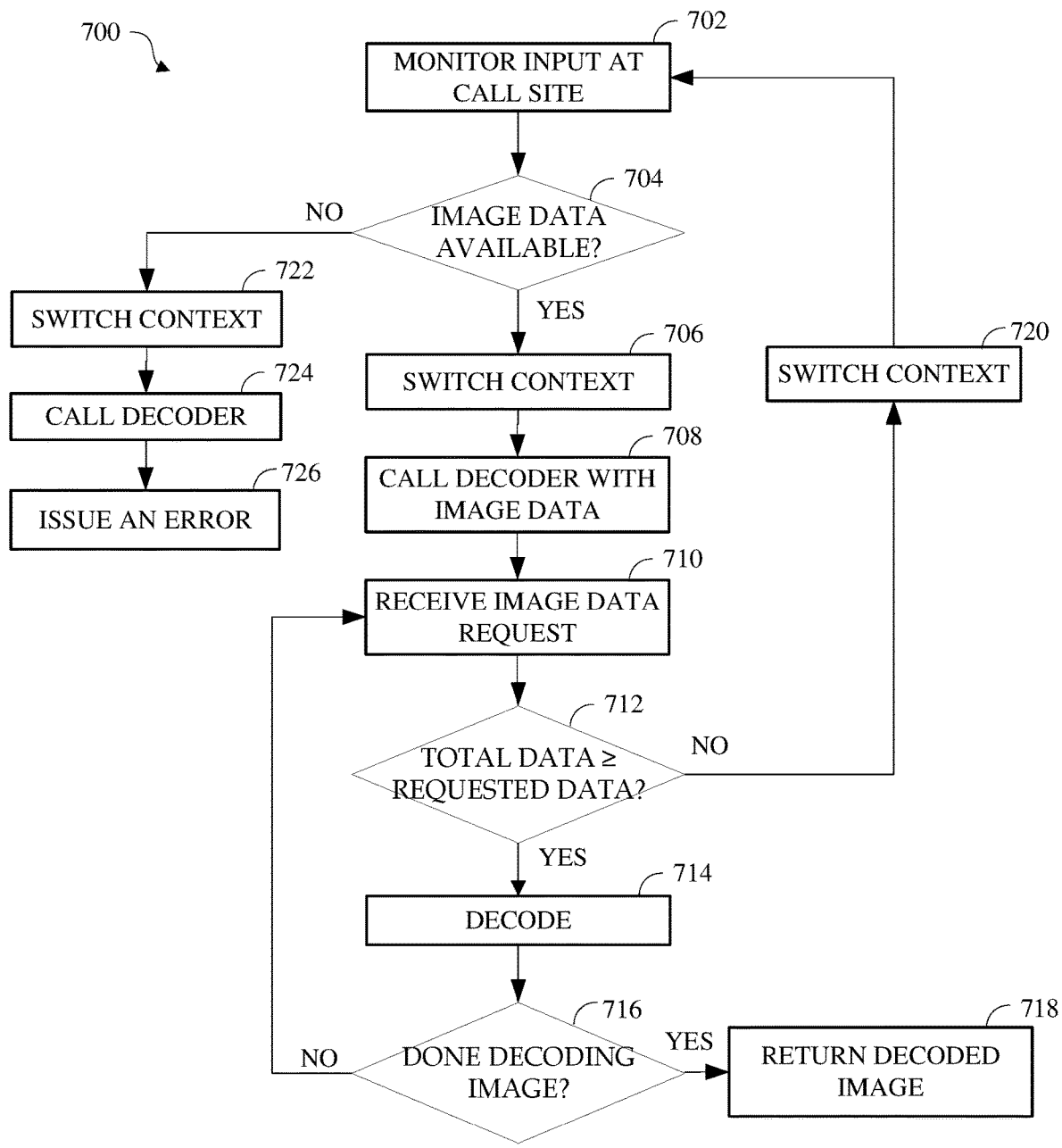
FIG. 7 is one example of a process of decoding an image from a compressed bitstream over time using implementations of this disclosure.

FIG. 7 is one example of a method or process 700 of decoding an image from a compressed bitstream over time using implementations of this disclosure. The process 700 may be implemented using the call site 610, the decoder 620, and the data stream accessor 630. In this example, the image data may be described as being measured in bytes.

At 702, an input is monitored at the call site 610 of a receiving station. When a video stream or a portion of the video stream is received, image data is available at 704. If image data is available at 704, the call site 610 can call the decoder 620 with the available amount of image data in conjunction with switching of the execution context at 706. That is, the call from the call site 610 to the decoder 620 may be intercepted by the data stream accessor 630, which in turn stores the current execution context of the call site 610 (e.g., as a restorable execution context of the call site 610) and passes the execution flow from the call site 610 to the decoder 620 at 706 before or while passing the call to the decoder at 708. An execution context of the decoder 708 is established for the execution flow. In some implementations, a previously-stored execution context of the decoder 620 may be loaded.

The decoder 620 can issue an indicator of a desired amount of image data, such as X bytes, to continue the decoding process. The indicator is referred to as a request in FIG. 7. At 710, the request is received. If the total amount of image data (such as N bytes) available to the decoder at the data stream accessor 630 is greater than or equal to the desired amount of image data (such as X bytes) needed to continue the decoding process at 708, the desired amount of image data is passed, copied, or otherwise transmitted to the decoder 620, and the decoder 620 decodes the received image data at 714.

If the image is completely decoded at 716, the decoded image is returned at 718 from the decoder 620 to the call site 610. This action does not involve the data stream accessor 630, and may be handled as conventionally done.

If the image is not completely decoded at 716, the process 700 may return to make a new request for a desired amount of image data to the data stream accessor 630 at 710 in order to continue the decoding process at the decoder 620. As long as the total amount of image data that is available to the decoder 620 (e.g., excluding the image data already sent to the decoder 620) the data stream accessor 630 is greater than or equal to the desired amount of image data that is needed to continue the decoding process at 712, decoding may continue until the image is completely decoded.

However, if the total amount of image data available to the decoder 620 is insufficient for the needs of the decoder 620 at 712, the process 700 may return to monitor for additional image data at 702 using the context switching of the data stream accessor 630 at 720. That is, the decoder 620 is paused at 720 by storing the current execution context of the decoder 620 as a restorable execution context of the decoder 620, passing the execution flow from the decoder 620 to the call site 610, and loading the restorable execution context of the call site 610 as the current execution context of the call site 610 so that the call site 610 resumes its wait for additional image data at 702. In conjunction with storing the current execution context of the decoder 620 and/or passing the execution flow from the decoder 620 to the call site 610, the data stream accessor 630 may provide a partially decoded portion of the image to the call site 610 for display.

If there is image data available at 704, the available amount of image data is obtained by the data stream accessor 630 from the call site 610, and context switching of the data stream accessor 630 occurs at 706 so that the subset of operations related to the decoder 620 takes place. In this implementation, the restorable execution context of the decoder 620 that was stored at 720 is loaded with the context switching at 706 as the current execution context of the decoder 620.

If there is no image data available at 704 when context is switched back to the call site 610 at 720 (e.g., the total amount of image data at the data stream accessor 630 not previously sent to the decoder 620 is less than the desired amount of image data, and the available amount of image data received at the data stream accessor 630 is none), the process 700 may advance to switch the context from the call site 610 to the decoder 620 at 722. The processing at 722 may be the same as the processing at 706. The data stream accessor 630 may call or otherwise indicate to the decoder 620 at 724 that the desired amount of image data is not available. The decoder 620 issues an error at 726. This action does not involve the data stream accessor 630, and may be handled as conventionally done.

As can be determined from the above description, the use of the data stream accessor with context switching is particularly useful where the call site and the decoder are executed using a single thread of execution. This is not required. For example, multiple threads may be used where, as described above, the data stream accessor is not incorporated into the decoder, but is instead instantiated and passed to the decoder from the call site. Even in this case, the context switching allows the decoder to operate without being explicitly aware of an interruption. The data stream accessor may store the current execution context of the decoder upon each request from the decoder in the event the execution flow needs to be passed from the data stream accessor to the call site. It is also possible to use multiple threads to implement an apparatus whereby the call site executes a routine to pass the available amount of image data to the data stream accessor upon receipt, but to allow the implementations described above to be used on a separate thread.

The inventors considered several techniques to handle bitstream interruptions.

One technique is to code a loop that will hang so long as no more data is available. However, the call site of the codec will not resume its execution flow or have a chance to cancel the decoding (e.g., due to the time spent or for another reason). This technique might also incur computation power bloat just to maintain an idle state.

Another technique is to use a function pointer given by the call site to the codec. The codec can then call the function pointer when data flow is paused and give back the execution flow to the caller. This technique only transfers the interruption issue to the call site, and it is not a convenient software pattern in the object-oriented languages generally used in modern codecs.

In some situations, a thread can be paused or resumed as the bytes run out or come in. However, this technique is not always available depending on the technology, the platform, or the number of images to concurrently decode. This technique might also imply some system overhead for situations were parallel processing is not needed. Error recovery may be made more difficult due to hanging threads and clean-up.

A technique that explicitly stores, at some previously defined steps of the process, all variables and environment necessary to continue the decompression is possible. If a chunk of data is incomplete for the next algorithm portion, the codec can return and wait for the call site to be executed again. This is difficult to implement. Either it is difficult to evaluate how much data is needed to continue, or a lot of different environments must be repeatedly stored. This technique might also have a relatively large memory footprint due to frequent data duplication.

Using coroutines is a technique that will yield to the call site when there is a streamed data shortage. A coroutine is not a feature available in all situations, and is not designed for these cases. For example, a coroutine requires the decoding steps to be able to yield. This might mean that most of the codec software lay in a main function, which is a clear constraint.

The teachings herein provide several advantages over these competing techniques.

First, the decoder is interruption-agnostic. That is, there is little or no development impact because the decompression algorithm does not need to be explicitly aware that an interruption happened. This is because, due to the context switching, the algorithm will resume exactly where it stopped with untouched local variable values.

Second, the decoder is object-oriented friendly because the call site can simply call the main entry point of the decoder again.

Third, the memory overhead of storing the call stack is often negligible compared to the space required to store the pixels.

Fourth, depending on the technology and the system, the data stream accessor described herein may be faster and less cumbersome than threads or coroutines.

For simplicity of explanation, the processes described herein are depicted and described as series of steps or operations. However, the steps or operations in accordance with this disclosure can occur in various orders and/or concurrently. Additionally, other steps or operations not presented and described herein may be used. Furthermore, not all described steps or operations may be required to implement a method in accordance with the disclosed subject matter.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in the figures.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, one or more elements of the methods described herein may be omitted from implementations of methods in accordance with the disclosed subject matter.

The implementations of the transmitting computing and communication device 100A and/or the receiving computing and communication device 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting computing and communication device 100A and the receiving computing and communication device 100B do not necessarily have to be implemented in the same manner.

Further, in one implementation, for example, the transmitting computing and communication device 100A or the receiving computing and communication device 100B can be implemented using a computer program that, when executed, carries out any of the respective methods, algorithms and/or instructions described herein. In addition or alternatively, for example, a special purpose computer/processor can be utilized that can contain specialized hardware for carrying out any of the methods, algorithms, or instructions described herein.

The transmitting computing and communication device 100A and receiving computing and communication device 100B can, for example, be implemented on computers in a real-time video system. Alternatively, the transmitting computing and communication device 100A can be implemented on a server and the receiving computing and communication device 100B can be implemented on a device separate from the server, such as a hand-held communications device. In this instance, the transmitting computing and communication device 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting computing and communication device 100A. Other suitable transmitting computing and communication device 100A and receiving computing and communication device 100B implementation schemes are available. For example, the receiving computing and communication device 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available. The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method of decoding an image from a compressed bitstream, the method comprising:
    performing a set of operations at a receiving device comprising:
        receiving, at a data stream accessor compatible with context switching, an available amount of image data of the image from a call site, the call site configured to call a decoder responsive to receiving at least a portion of the compressed bitstream from a network;
        storing a current execution context of the call site as a restorable execution context of the call site;
        passing execution flow to the decoder from the call site;
        performing a subset of operations comprising:
            receiving, at the data stream accessor, an indication of a desired amount of image data determined by the decoder;
            if a total amount of image data at the data stream accessor not previously sent to the decoder is greater than or equal to the desired amount of image data:
                transmitting the desired amount of image data to the decoder; and
            otherwise, and unless an error has issued:
                storing a current execution context of the decoder as a restorable execution context of the decoder;
                passing the execution flow from the decoder to the call site; and
                loading the restorable execution context of the call site as the current execution context of the call site; and
        repeating the subset of operations unless the image is completely decoded or the error has issued.

2. The method of claim 1, further comprising:
    after loading the restorable execution context of the call site as the current execution context of the call site, awaiting further image data from the call site for a defined amount of time; and
    responsive to determining that no further image data is available when the defined amount of time lapses:
        storing a current execution context of the call site as a restorable execution context of the call site;
        passing execution flow to the decoder from the call site;
        loading the restorable execution context of the decoder as the current execution context of the decoder; and
        transmitting a signal to the decoder that the desired amount of image data is unavailable, resulting in issuance of the error.

3. The method of claim 1, further comprising:
repeating the set of operations after loading the restorable execution context of the call site as the current execution context of the call site.

4. The method of claim 3, further comprising:
if the total amount of image data at the data stream accessor not previously sent to the decoder is less than the desired amount of image data, and the available amount of image data received at the data stream accessor is none, transmitting a signal to the decoder that the desired amount of image data is unavailable, resulting in issuance of the error.

5. The method of claim 1, further comprising:
after loading the restorable execution context of the call site as the current execution context of the call site, transmitting an indicator to the decoder that the desired amount of image data is not available, resulting in issuance of the error.

6. The method of claim 1, further comprising:
receiving, at the decoder, the desired amount of image data;
decoding the desired amount of image data as received; and
responsive to decoding the desired amount of image data as received, transmitting, from the decoder, another indication of the desired amount of image data unless the image is completely decoded.

7. The method of claim 6, further comprising:
transmitting, to the call site, the image when the image is completely decoded.

8. The method of claim 1, further comprising:
transmitting, from the decoder, the image to the call site when the image is completely decoded.

9. The method of claim 1, further comprising:
before performing the set of operations:
    receiving, at the receiving device, a request for decoding the image from the network; and
    responsive to the request for decoding the image, transmitting the available amount of image data of the image from the call site; and
after passing the execution flow from the decoder to the call site:
    awaiting, from the network, receipt of further image data; and
    if receiving further image data at the call site, transmitting the further image data to the data stream accessor.

10. The method of claim 9, further comprising:
repeating the set of operations with the further image data as the available amount of image data;
before performing the subset of operations, loading the restorable execution context of the decoder as the current execution context of the decoder.

11. The method of claim 1, further comprising:
receiving, by the call site, the available amount of image data; and
decoding, by the decoder, the desired amount of image data, wherein the call site and the decoder are executed using a single thread of execution.

12. An apparatus for decoding an image from a compressed bitstream, the apparatus comprising:
a data stream accessor compatible with context switching that is implemented by one or more processors at a receiving device, the data stream accessor configured to:
    perform a set of operations comprising:
        receiving an available amount of image data of the image from a call site, the call site configured to call a decoder responsive to receiving at least a portion of the compressed bitstream from a network;
        storing a current execution context of the call site as a restorable execution context of the call site;
        passing execution flow to the decoder from the call site;
        performing a subset of operations comprising:
            receiving, at the data stream accessor, an indication of a desired amount of image data determined by the decoder;
            if a total amount of image data at the data stream accessor not previously sent to the decoder is greater than or equal to the desired amount of image data:
                transmitting the desired amount of image data to the decoder; and
            otherwise, and unless an error has issued:
                storing a current execution context of the decoder as a restorable execution context of the decoder;
                passing the execution flow from the decoder to the call site; and
                loading the restorable execution context of the call site as the current execution context of the call site; and
        repeating the subset of operations unless the image is completely decoded or the error has issued.

13. The apparatus of claim 12, wherein the data stream accessor is configured to:
after loading the restorable execution context of the call site and passing the execution flow from the decoder to the call site, repeat the set of operations.

14. The apparatus of claim 12, wherein the data stream accessor is configured to perform the subset of operations multiple times such that the data stream accessor receives multiple requests for image data from the decoder.

15. The apparatus of claim 12, wherein the data stream accessor is configured to, in conjunction with passing the execution flow from the decoder to the call site, provide a partially decoded portion of the image to the call site for display.

16. The apparatus of claim 12, wherein the data stream accessor is configured to, in conjunction with a request for the desired amount of image data, store the current execution context of the decoder as the restorable execution context of the decoder, and in conjunction with transmitting the desired amount of image data, load the restorable execution context of the decoder as the current execution context of the decoder.

17. The apparatus of claim 12, further comprising:
the call site implemented by one or more processors and configured to:
    receive the available amount of image data from the network; and
    transmit the available amount of image data to the data stream accessor; and
the decoder configured to decode the desired amount of image data.

18. The apparatus of claim 17, wherein the call site and the decoder are executed using a single thread of execution.

19. An apparatus for decoding an image from a compressed bitstream, the apparatus comprising:
a call site implemented by one or more processors and configured to call a decoder responsive to receiving at least a portion of the compressed bitstream from a network;
the decoder configured to decode the compressed bitstream; and a data stream accessor compatible with context switching that is implemented by one or more processors, the data stream accessor configured to:
  receive an available amount of image data of the image from the call site;
  store a current execution context of the call site as a restorable execution context of the call site;
  pass execution flow to the decoder from the call site; and
  load an execution context of the decoder,
wherein the decoder is configured to, until the decoder completely decodes the image or issues an error:
  provide an indication to the data stream accessor of a desired amount of image data determined by the decoder;
  while a total amount of image data at the data stream accessor is greater than or equal to the desired amount of image data, receive the desired amount of image from the data stream accessor, thereby reducing the total amount of image data remaining at the data stream accessor by the desired amount of image data; and
  decode the desired amount of image data, and
wherein the data stream accessor is configured to, responsive to the total amount of image data at the data stream accessor being less than the desired amount of image and unless the decoder completely decodes the image or issues the error:
  store a current execution context of the decoder as a restorable execution context of the decoder;
  pass the execution flow from the decoder to the call site; and
  load the restorable execution context of the call site as the current execution context of the call site to monitor for additional image data.

20. The apparatus of claim 19, wherein storing the current execution context of the decoder as a restorable execution context of the decoder and passing the execution flow from the decoder to the call site comprises returning a partially decoded image to the call site.

* * * * *